United States Patent [19]
Galbraith

[11] Patent Number: 5,438,795
[45] Date of Patent: Aug. 8, 1995

[54] TRELLIS WIRE SUPPORT SYSTEM

[76] Inventor: John M. Galbraith, P.O. Box 216, San Leandro, Calif. 94577

[21] Appl. No.: 147,206

[22] Filed: Nov. 3, 1993

[51] Int. Cl.⁶ ............................................... A01G 17/06
[52] U.S. Cl. .......................................... 47/46; 256/48
[58] Field of Search ........................ 256/48, 10; 46/46

[56] References Cited

U.S. PATENT DOCUMENTS

| | | | |
|---|---|---|---|
| 353,129 | 11/1886 | Gholson | 256/48 |
| 3,411,754 | 11/1968 | Fahrenholz | 256/48 |
| 3,568,980 | 3/1971 | Halburt | 256/10 |
| 4,329,811 | 5/1982 | Coulson | 47/46 R |
| 4,965,961 | 10/1990 | Broyles | 47/46 R |

FOREIGN PATENT DOCUMENTS 17490 10/1980 European Pat. Off. ............. 256/48

*Primary Examiner*—Henry E. Raduazo
*Attorney, Agent, or Firm*—Charles E. Townsend, Jr.

[57] ABSTRACT

A grapevine trellis system incorporating substantially Z-shaped wire supporting bracket arms arranged and constructed to be alternately and universally mounted on solid T-bar posts, metal roll formed T-shaped posts, and/or conventional rectangular wooden posts.

10 Claims, 2 Drawing Sheets

TRELLIS WIRE SUPPORT SYSTEM

BACKGROUND OF THE INVENTION

1. Field of the Invention

This invention relates to an improved vineyard trellis system and, in particular, a trellis system incorporating specially constructed and arranged bracket arms for mounting on vertical posts for supporting parallel trellis wires which in turn support the grapevines as the plant matures and grows to full height over a period of years.

2. Description of the Relevant Art

It is more or less standard practice in vineyards in California and elsewhere to plant the vines spaced apart in parallel rows and columns. After the vines grow out of the seedling stage and reach a height of perhaps 12 to 18 inches or so vertical stakes or posts are driven or embedded into the earth along a line paralleling each planted row. The stakes are spaced according to terrain changes. For example, on relatively level terrain the stakes might be placed from 15 to 25 feet apart, whereas on undulating terrain the stakes may be positioned mainly at the peaks and valleys.

Further, it is conventional to embed the stakes between plants in center alignment with the row so that wire supporting bracket arms can be mounted on the posts so that each arm extends to opposite sides of the post in a direction substantially perpendicular to the axis of the planted row. Parallel trellis wires are strung on the bracket arms so as to tautly span the distance between the posts to either side of the main stems of the vines. The bracket arms are mounted on the posts at a vertical height above the ground related to the height of the vine branches to be supported by and between the parallel wires. Periodically, as the vine matures and grows in height, the bracket arms are either adjustably moved upwardly along the post to accommodate the growing vine, or the old bracket arms are left in their original positions on the stake as useless appendages, and new brackets are installed above the old abandoned brackets to accommodate for the increased height of the vines as time goes on.

Historically, and until fairly modern times, the vertical posts were simply rectangular in cross section wooden stakes to which the wire supporting cross arms could be nailed.

As time has progressed and more efficient ways sought to maximize efficiency and economize in all phases of vineyard operations, metal stakes have replaced or are replacing wooden stakes, although this is not the say that wooden stakes have become extinct in vineyard operations. The metal stakes most commonly used in California vineyards, for example, are conventional solid T-bar fence posts of the type having a foot plate welded adjacent its bottom end to stabilize the post when its driven in and buried well below the surface of the earth. Another popular metal stake is made of roll formed metal and is also generally T-shaped in cross section. Usually, the roll formed metal stake does not necessarily require a foot plate to stabilize it once driven into the earth a substantial distance such as 18 inches or more.

To my knowledge, there is no vineyard trellis system on the market today which is so versatile that a single bracket arm component of the system can be utilized with equal ease and economy with rectangular wooden posts, solid T-bar posts and/or conventional metal roll formed post as above described. In short, a bracket arm useful for attachment to a wooden post may not be equally adaptable, if at all, to be supported by either the T-bar fence post or the roll formed post. Likewise, it has been my observation and understanding that special bracket arms made to especially fit and be used with solid T-bar posts are not as suitable, if at all, for use with wooden posts or roll formed posts.

SUMMARY OF THE INVENTION

A primary object of the present invention is to provide a trellis wire bracket arm support equally adaptable for use with and attachment to wooden posts, and T-shaped metal posts of both the solid T-bar and metal roll formed type.

Another specific object of the invention is to provide novel wire support means on the bracket arms which renders it virtually impossible for the trellis wires to become disengaged from their arm supports during installation or thereafter.

Other numerous objects and advantages of the present invention will become apparent upon reading the following specification and referring to the accompanying drawings in which corresponding parts in each of the several views are similarly designated.

DETAILED DESCRIPTION OF THE DRAWINGS

Figure 7:
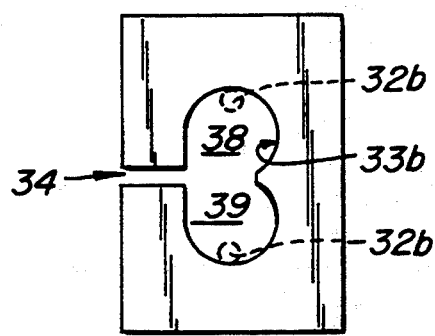
FIG. 7 is a fragmentary front elevational view of a wire supporting slot.

Referring more specifically to the drawings, FIG. 7 shows schematically the profile of a fragment of an installed trellis system depicting spaced apart vertical posts, indicated generally at 10 which have bracket arms (not shown in FIG. 7) to support continuous trellis wires at different angles relative to horizontal, and indicated W-1 and W-2, and about which more will be explained hereinafter.

Figure 1:
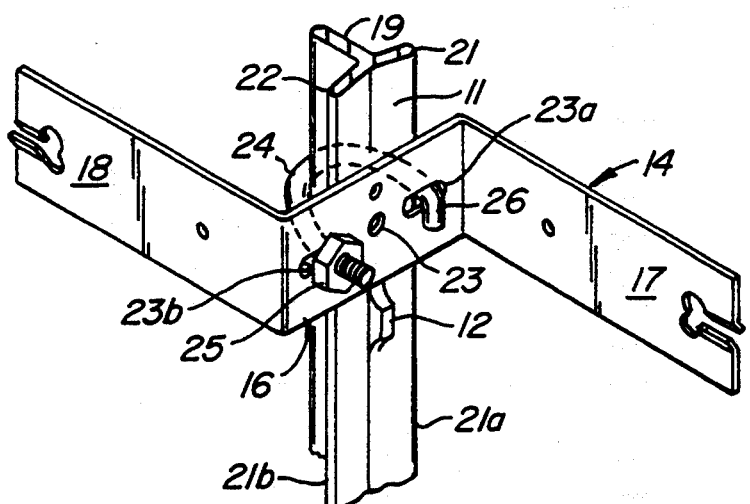
FIG. 1 is a fragmentary view of a standard T-bar fence post showing a novel trellis wire supporting bracket mounted to the post by one preferred mounting means.
Figure 4:
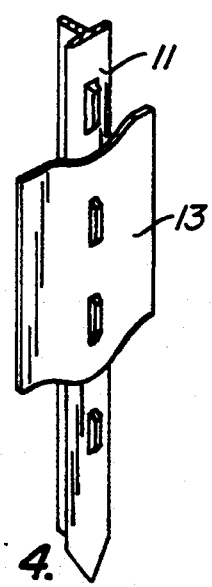
FIG. 4 shows the bottom fragment of a T-bar post with a conventional foot plate mounted to the flat side of the T-bar.

FIG. 1 is a fragmentary view of a conventional solid T-bar fence post 11, usually formed with spaced apart wire stops 12. FIG. 4 shows a fragment of the lower most regions of a conventional T-bar type post which is conventionally provided with a foot plate 13 which helps stabilize the post 11 when the lower end is driven into the ground the conventional 18" or so. In grape trellis systems, it is standard practice to drive the post into the ground so that the flat plane of the foot plate 13 parallels the direction of the trellis wires supported by the post after the post is installed.

FIG. 1 further discloses a generally Z-shaped bracket arm, indicated generally at 14 and which is fabricated out of relatively heavy sheet metal and is formed, as by bending, to define a relatively flat central web 16 and first and second leg portions 17 and 18 which extend outwardly in opposite directions from and at right angles to the respectively associated ends of the web portion 16.

Inherently, a conventional solid T-bar stake such as shown in FIG. 1 comprises a central vertical stem portion 19 integrally formed with lateral wing portions 21 and 22 at right angles to the plane of stem portion 19. The wing portions 21 and 22 define outer edges 21(a) and 21(b) which provide spaced apart bracket arm contact surfaces to permit mounting of the web portion 16 of a bracket arm to the T-bar so that the outwardly extending legs 17 and 18 of the bracket arm project at an axis substantially perpendicular to the foot plate 13 of the T-bar and perpendicular also to the direction of the trellis wires to be suspended by the outer ends of the bracket arms by means to be more specifically described.

FIG. 1 further shows how the web portion 16 may be formed with spaced apart attachment slots 23(a) and 23(b) and a preformed nail hole 23. In FIG. 1, the inner side of web 16 is secured against the laterally spaced contact edges 21(a) and 21(b) by a semi-circular hook shaped bolt 24 having a threaded end to receive a nut 25, and a hooked end 26 to project through the slot 23(a) and engage the outer side of the web 16 to hold the bracket arm in place when the nut is tightened against the threaded end of bolt 24.

Figure 2:
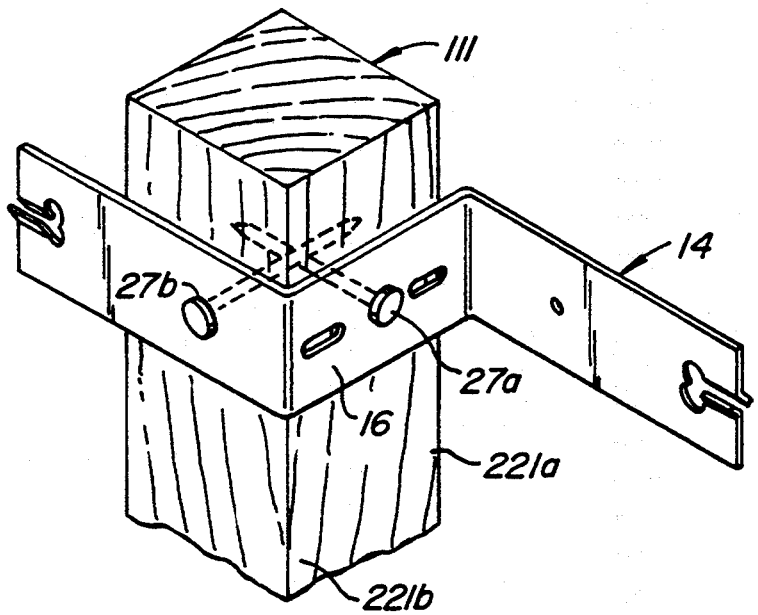
FIG. 2 is the same as FIG. 1 except the bracket is mounted by nailing to a conventional wood stake.

FIG. 2 shows the same bracket arm 14 mounted, as by nailing to a conventional 2"×2" wooden post, indicated generally at 111. More specifically, a pair of nails 27(a) and 27(b) are driven into the wood through nail holes 23 into the wood stake at right angles to each other whereby the flat web portion 16 of the bracket arm contacts the relatively flat surface of one side of the post including of course the spaced apart outer edges 221(a) and 221(b) thereof.

Figure 3:
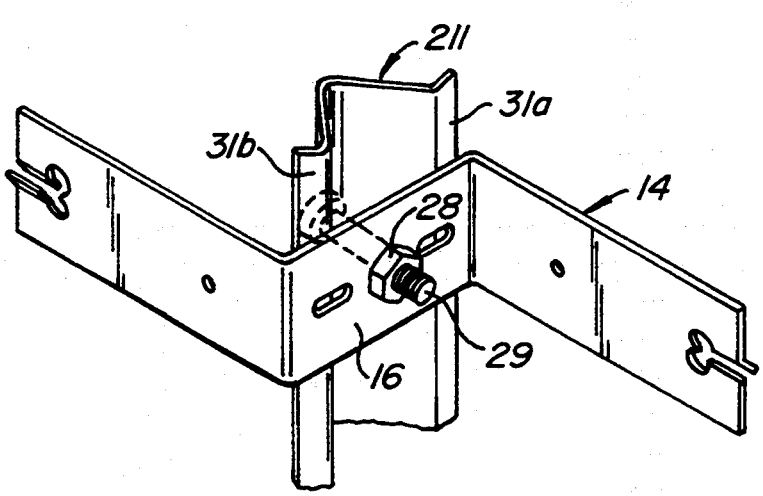
FIG. 3 is the same as FIG. 1 except the bracket is mounted to a T-shape metal roll-form stake by bolting.

FIG. 3 shows a bracket arm 14 mounted by a single threaded nut and bolt 28 and 29 to a roll formed metal post 211 of generally T-shaped cross section defined by a V-shaped central body terminating in outwardly extending lateral flanges 31(a) and 31(b) which in turn provide the laterally spaced support edges against which the web 16 of the bracket arm can tightly abut against upon tightening of the nut and bolt assembly 28 and 29.

Figure 5:
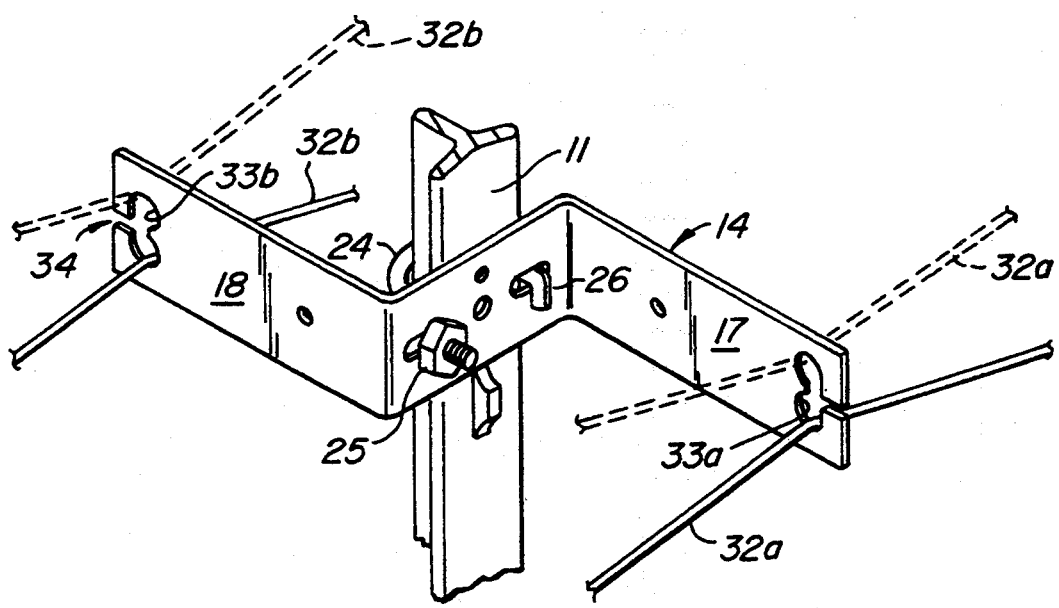
FIG. 5 is similar to FIG. 1 and further showing the slotted outer ends of the bracket arms supporting trellis wires.
Figure 6:
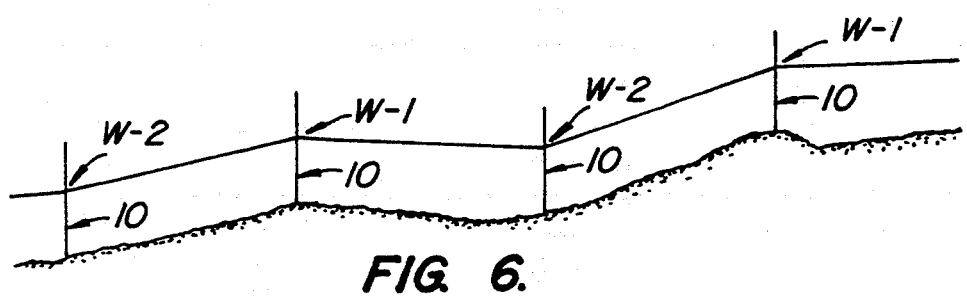
FIG. 6 is a schematic view of a trellis post and wire system.

FIG. 5 is substantially identical to FIG. 1 in showing a bracket arm 14 bolted by assembly 24, 25 and 26 to a T-bar post 11. FIG. 5 further shows a pair of parallel trellis wires 32(a) and 32(b) in two modes of suspension within wire support key hole shaped openings 33(a) and 33(b).

Figures 8, 9:
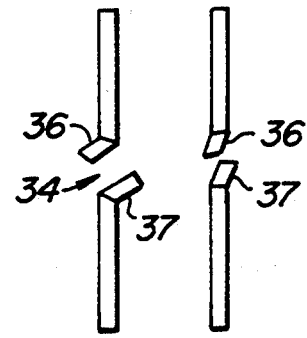
FIG. 8 is a section of the passage into the slot.
FIG. 9 shows the passage when squeezed closed.

FIG. 7 is an enlarged fragmentary elevational view of the outer end of bracket arm 18 and showing an enlarged view of its wire support opening 33(b). A wire access passage 34 is formed between inwardly and outwardly bent skirt or flap sections 36 and 37. As shown in FIG. 8, passage 34 is larger than the outside diameter of the trellis wire to be suspended whereby as the wire is consecutively supported on adjacent supporting posts it may be laterally slipped in through the passageways in the confines of the opening. In installation, when the bent flaps 36 and 37, when squeezed, as by hand pliers, toward one another (as shown in FIG. 9) will reduce the diameter of the passageway is reduced sufficiently so that the wire cannot be accidentally dislodged from its associated opening.

Each of the wire support openings 33(a) and 33(b) define an upper substantially semi-circular segment 38 and a lower substantially semi-circular segment 39 extending above and below, respectively, the horizontal axis of wire passageway 34. Whether a trellis wire will bear against the upper or lower segments 38 or 39 will depend upon the angle from horizontal of the trellis wire at its point of entry and egress from the opening as to each bracket arm supporting post. FIG. 7 shows how the trellis wire at post locations W-1 are inclined downwardly from horizontal in which case the wires 32(a) and 32(b) would bottom out and be supported by lower segment 39, whereas the trellis wires at positions W-2 enter at angles inclined above horizontal whereby said wires nest within the confines of the upper segments 32(b) of the wire support opening. By providing both upper and lower wire supporting segments, there is very little chance of the wire escaping back through passage 34 during wire installation or thereafter. Even if a workman fails to close and pinch together skirts 36 and 37 to close off the passageway, the wire in all likelihood will remain nested within one of the other segments and be restrained from lateral movement outwardly through the passageway.

Although the present invention has been described in some detail by way of illustration and example, it will be understood that numerous modifications within the skill of the art could be made within the scope of the invention, as limited only by the scope of the claims appended hereto.

What is claimed:

1. A trellis wire support system comprising: a plurality of horizontally spaced apart vertical posts adapted to support between them one or more trellis line wires;
    each post having a first side defined by horizontally spaced apart co-planar contact surfaces defining substantially the maximum width of said first side;
    said spaced apart posts positioned with their respective first sides disposed substantially parallel to the direction in which the line wires extend;
    a plurality of substantially identically formed generally Z-shaped bracket arms;
    at least one bracket arm mounted on each post;
    each bracket arm comprising a central flat web portion and first and second leg portions extending outwardly in opposite directions from, and at right angles to respectively associated opposite ends of said web portion;
    each bracket arm mounted on a post with the flat web section of the bracket arm securely positioned in contacting position with the respective first sides of an associated post and with the leg portions extending laterally outwardly to opposite sides of said post in opposite directions perpendicular to the plane of the spaced apart flat surfaces on the first side of said post;
    and means associated with the outer ends of the leg portions of each bracket arm for supporting a trellis line wire.

2. The combination of claim 1 and wherein said last named means comprises a keyhole shaped opening formed through each leg adjacent its outer end, a wire access passageway connecting the outer edge of each leg portion with the interior of said keyhole shaped opening.

3. The combination of claim 2 and wherein said keyhole opening is defined by an upper arcuate opening located above the horizontal axis of the wire access passageway and a lower arcuate opening in communication with the upper opening located below the horizontal axis of said wire access passageway.

4. The combination of claim 3 including means for retaining in place a wire inserted through said passageway into said keyhole opening.

5. The combination of claim 4 and wherein said wire retaining means comprises two closely vertically spaced apart oppositely outwardly bent upper and lower flaps, and wherein the vertical spacing between the flaps defines the wire access passageway, and wherein further said flaps are arranged and constructed to be manually bent and pinched toward one another to narrow and substantially close the passageway to prevent a wire from passing therethrough.

6. The combination of claim 1 and wherein each post is generally T-shaped in cross section, defining a central stem portion and two laterally spaced apart right and left wing sections co-planar with each other and lying in a plane perpendicular to the vertical plane of the central stem portion;

and wherein the said two laterally spaced apart flat surfaces are defined by said left and right wing sections.

7. The combination of claim 6 and wherein each post is formed as a solid T-bar fence stake.

8. The combination of claim 6 and wherein each said post is fabricated from roll formed metal.

9. The combination of claim 1 and wherein each said post comprises a wood stake rectangular in cross section and wherein said two laterally spaced apart flat surfaces comprise the spaced vertical marginal areas of one side of each rectangular post.

10. A trellis wire support system comprising:
a plurality of horizontally spaced apart vertical posts adapted to support between them one or more trellis line wires, each post defining a generally T-shape in cross-section including a central longitudinal stem portion and two laterally spaced apart right and left wing sections co-planar with each other and lying in a plane perpendicular to the vertical plane of the central stem;
said spaced apart posts positioned with their left and right wing sections disposed substantially parallel to the direction in which the line wires extend;
a plurality of substantially identically formed generally Z-shaped bracket arms;
at least one bracket arm mounted on each post;
each bracket arm comprising a central flat web portion and first and second leg portions extending outwardly in opposite directions from, and at right angles to, the respectively associated ends of said web portion;
each bracket arm mounted on a post with the flat web section of the bracket arm securely positioned in contacting position with the left and right wing sections of an associated post and with the leg portions extending laterally outwardly to opposite sides of said post in opposite directions perpendicular to the plane of the right and left wing sections of said post and means associated with the outer end of each leg portion for supporting a trellis wire.

* * * * *